(No Model.)
R. COWEN.
WOVEN TIRE.
No. 591,456. Patented Oct. 12, 1897.
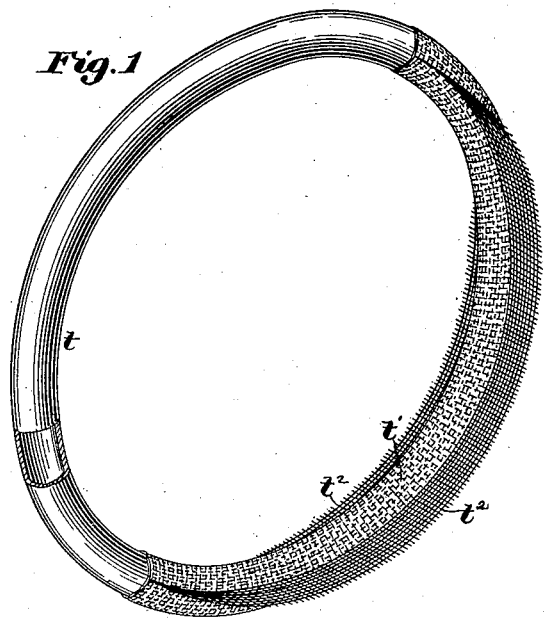
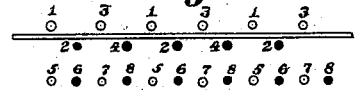
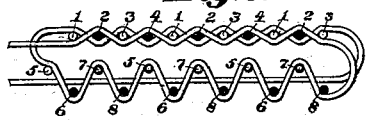
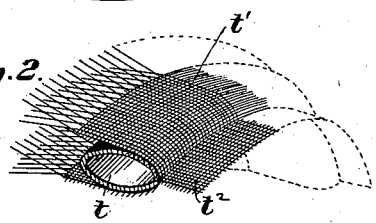
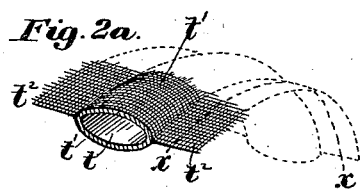
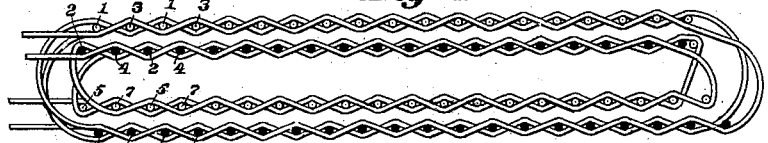
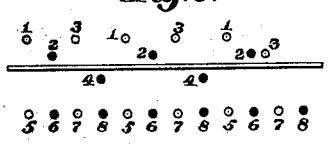
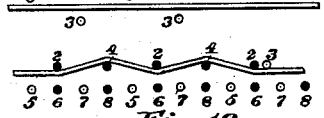
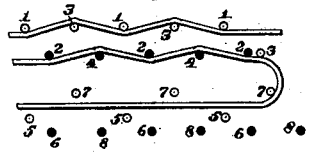
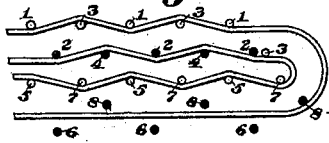
Witnesses.
A. C. Harmon
Walter E. Lombard
Inventor.
Robert Cowen.
By Crosby Gregory
Attys.
THE NORRIS PETERS CO., PHOTO-LITHO., WASHINGTON, D. C.

UNITED STATES PATENT OFFICE.

ROBERT COWEN, OF CAMBRIDGE, MASSACHUSETTS, ASSIGNOR TO THE BOSTON WOVEN HOSE AND RUBBER COMPANY, OF BOSTON, MASSACHUSETTS.

WOVEN TIRE.

SPECIFICATION forming part of Letters Patent No. 591,456, dated October 12, 1897.

Application filed January 16, 1897. Serial No. 619,418. (No model.)

*To all whom it may concern:*

Be it known that I, ROBERT COWEN, of Cambridge, county of Middlesex, State of Massachusetts, have invented an Improvement in Woven Tires, of which the following description, in connection with the accompanying drawings, is a specification, like letters and figures on the drawings representing like parts.

This invention has for its object the production of an endless seamless woven tubular tire containing an endless india-rubber tube, the india-rubber tube constituting a lining to the tire.

In my invention I weave a tubular fabric having a diameter suitable for the diameter of the inflated tire, the said tube presenting in the direction of its length alternately narrow single-ply sections separated by wider two-ply sections, the two-ply sections constituting the endless seamless tubular woven tire.

Figure 1 shows an endless lining-tube covered for half of its length by an endless seamless woven tube, the other half of the tubular cover being omitted to better show the lining-tube, the latter tube being broken out. Fig. 2 is a partial view showing part of the woven tubular covering with the warps separated as when weaving the tube part of the tire, the lining-tube having been laid between the inner and outer plies of the tubular part of the tire preparatory to again bringing all the warps together to weave a single fabric to inclose the lining-tube in a tubular cover. Fig. 2ª shows the warps entering into the two plies of Fig. 2 brought together into a single ply and inclosing the lining-tube within the tubular woven bicycle-tube to constitute a tire. Fig. 3 is a cross-section of the single-ply part of the woven tube in the line $x$, Fig. 2ª. Fig. 4 shows a like section of the tubular or two-ply portion of the tube. Figs. 5 to 8 are diagrams illustrating the method of weaving the one-ply portion of the large tube, and Figs. 9 to 12 are diagrams illustrating the method of weaving the double-ply portion of the large tube.

The novel product resulting from my novel method consists in an endless seamless woven tubular outer covering $t'$, which in the description, for brevity, I may hereinafter designate as the "tubular covering," it inclosing a tubular endless lining-tube $t$, of india-rubber. In the production of this novel product I weave in a loom a tube the circumference of which will be of a size sufficient for the length of the bicycle-tire which it is desired to produce, and in the direction of its length I weave this large tube as a single-ply fabric, as shown at $t^2$, and then as a double-ply fabric, as shown at $t'$, the length of the single-ply parts in the direction of the length of the tube being quite short, while the double-ply parts are of a length equal to the diameter desired in cross-section for the bicycle-tire to be produced, the said large tube being separated transversely of its length through the single-ply portions, thus leaving a series of endless seamless woven tubular fabric inclosing india-rubber lining-tubes, each of said two-ply sections constituting a bicycle-tire. I prefer to weave the tubular fabric referred to on a flat loom, it being provided with two shuttles, the loom containing eight harness-frames, in which are mounted eight sets of warp-threads, said harnesses being shed in such order as to, in connection with the threads of the shuttle, weave at times a large single-ply tube, as in Fig. 3, and then the said harnesses will be so moved for a number of sheds as to split the warps into four sheds for the formation with the shuttle-threads of two distinct plies of fabric, as in Fig. 4, each of said plies constituting a part of the tubular covering, one ply lying inside the other, as best represented in Fig. 4.

When the two-ply tubular fabric has been woven of sufficient length to make a bicycle-tire of the proper diameter in cross-section, the loom is stopped, and while the two plies are separated, as in Fig. 2, an india-rubber lining-tube is laid in between said plies and the ends of the tube are joined together, using, preferably, suitable india-rubber cement to thus make of the india-rubber tube an endless tube. This done, the loom is again started and the harnesses are again operated to bring the warps into position to be locked by the weft and again make a single-ply tube, the closing of the two plies about the india-rubber tube making a tubular covering without seam for the india-rubber or lining-tube.

The large tubular fabric may be woven of indifferent length, as described, and may be subsequently separated through the single-ply sections, leaving a series of india-rubber lining-tubes provided with seamless tubular covering. These endless seamless woven tubular tires containing the india-rubber lining-tubes may, if desired, be thereafter coated with any usual vulcanizing compound of any desired thickness, and the tire so treated may be vulcanized in any usual manner.

I will now describe one practical way of weaving this large tube.

I employ a loom having eight harness-frames, each having a set of warp-threads, which in the drawings I have numbered to correspond with the number of the frame carrying them. The diagrammatical Figs. 5 to 12 show only a few of the warp-threads used, but enough of said threads are shown to enable my invention to be understood.

I will first describe the method employed for shedding the warps to make the one-ply part of the tube.

Referring to Fig. 5, only the warp-threads 1 and 3 are put into the upper plane of the shed by raising the harness-frames carrying them, and the weft $f$ will be put in, say, from the left to the right, and then all the warps except 5 and 7 will be raised, leaving these latter warps down in the lower plane of the shed, and the weft will be put through the shed from right to left, as shown in Fig. 6. In the next round the shed will be formed, as in Fig. 7, by putting the warp-threads 2 and 4 into the upper plane of the shed, leaving all the rest down, and the weft will be put in from left to right, and at the next shed all the threads except 6 and 8 will be lifted, leaving 6 and 8 alone in the bottom of the shed, and the weft will be put in from right to left. In this way I weave a plain single-ply tube.

To weave the double-ply tube or one tubular ply inside the other, as shown in Figs. 4 and 2, the harnesses will be moved in a different time and order—as, for instance, (see Fig. 9,) all the warps 1, 2, 3, and 4 will be separated from the warps 5, 6, 7, and 8, and warps 1, 2, 3, and 4 will be so shed as to enable two plies of fabric to be woven, and warps 5, 6, 7, and 8 will also be shed to form two plies, the two plies extending entirely about the tube and making a pocket. For instance, the shed in Fig. 9 for the outer of the two plies is made by raising all the warp-threads 1 and all but one of the threads 3 and all the threads 2, making the shed between the threads 2 and 4, and at the same time a shed will be formed between the threads 1 and 3, as at the upper part of Fig. 10, and a weft-thread, each from its own shuttle, will be laid in said sheds from left to right, as represented in the upper part of Fig. 11, thus making two plies, and for the return of both wefts a shed for the inner ply will be formed between 5 and 7, as at the lower part of Fig. 11, and between threads 6 and 8, as shown in the lower part of Fig. 12. The next sheds will be the same as just described, with the exception that threads 2 will occupy the position shown by 4 in Fig. 9, and threads 1 in the position of threads 3, Fig. 10, and 7 the position of 5 in Fig. 11, and 8 the position of 6 in Fig. 12, all as will be well understood by practical weavers. When it is desired to weave a pocket in, or tubular part in a web being woven, and while the two plies are separated, as in Fig. 2, an endless india-rubber lining-tube is laid in between said plies as in Fig. 2, and then the harnesses are again operated to bring the warps into position to be locked by the weft and make a single ply or thickness tube, the closing of the two plies making a tubular jacket to completely inclose the india-rubber or lining-tube. In this way a tubular fabric of large diameter may be woven in indefinite length, the said tube as it is delivered from the loom presenting narrow circular sections of one-ply thickness interspersed with two-ply sections containing and completely inclosing an endless india-rubber tube, so that said large tube of indefinite length may thereafter be cut up crosswise through the one-ply section, leaving a series of endless bicycle-tires presenting a seamless covering embracing an india-rubber lining-tube. In other words, eight sets of warp-threads are so shed as to enable a tubular fabric to be woven with circumferential pockets, the making of the pockets making it necessary to separate the warps in such manner as to receive the weft and leave a two-ply portion, or leave one tube within another, which will be well understood by one conversant with weaving, and should a stronger fabric be required than that presented by a plain cotton weave a larger number of harnesses may be employed to weave after the well-known fashion of twilling.

After the two-ply or pocket portions of the tube have been woven, as described, for a length suitable for the diameter in cross-section of a bicycle-tire I hold the two-ply portions separated, as in Fig. 2, and insert an inner tube $t$, of india-rubber, it constituting a lining-tube, and I join the ends of said tube together, using, preferably, some suitable india-rubber cement, and this done the weaving is continued and all the warps are shed again, as described, for the production of a single-ply tube, as referred to in the description of Figs. 5 to 8. The large tube so woven will then be cut transversely into sections through the single-ply portion $t^2$, leaving the india-rubber-lined two-ply endless tubular sections suitable for bicycle or other tires.

The tube may be woven of any desired diameter, that depending on the number of warp-threads employed, and the diameter of the tubular tire may be varied, as desired, by making the two-ply portions of greater or less length. I may also, if desired, weave the tubular fabric on a circular loom instead of on a flat loom.

The edges or fins left on the tubular-tire portions by cutting through the one-ply tubular portion may be cut off more or less close to the tubular covering, and the edge so left may be folded back upon the tire at either side, preferably between the inner side half of the tire and the rim of the wheel.

The endless seamless woven tubular tire inclosing the endless india-rubber tire may be subsequently coated or covered with any suitable vulcanizing compound, and the same may be vulcanized to make a proper tread-surface of any desired shape or thickness.

Having fully described my invention, what I claim, and desire to secure by Letters Patent, is—

1. An endless seamless woven tubular tire containing an endless india-rubber tube, substantially as described.

2. An endless seamless woven tubular tire containing an endless india-rubber tube, and covered externally with a vulcanized outer covering, substantially as described.

In testimony whereof I have signed my name to this specification in the presence of two subscribing witnesses.

ROBERT COWEN.

Witnesses:
   J. W. BELOWS,
   T. G. RICHARDS.